Sept. 2, 1969   L. COX   3,464,676
MIXER-DISTRIBUTOR FOR DRY CEMENTITIOUS MATERIAL
Filed Oct. 9, 1967   4 Sheets-Sheet 1
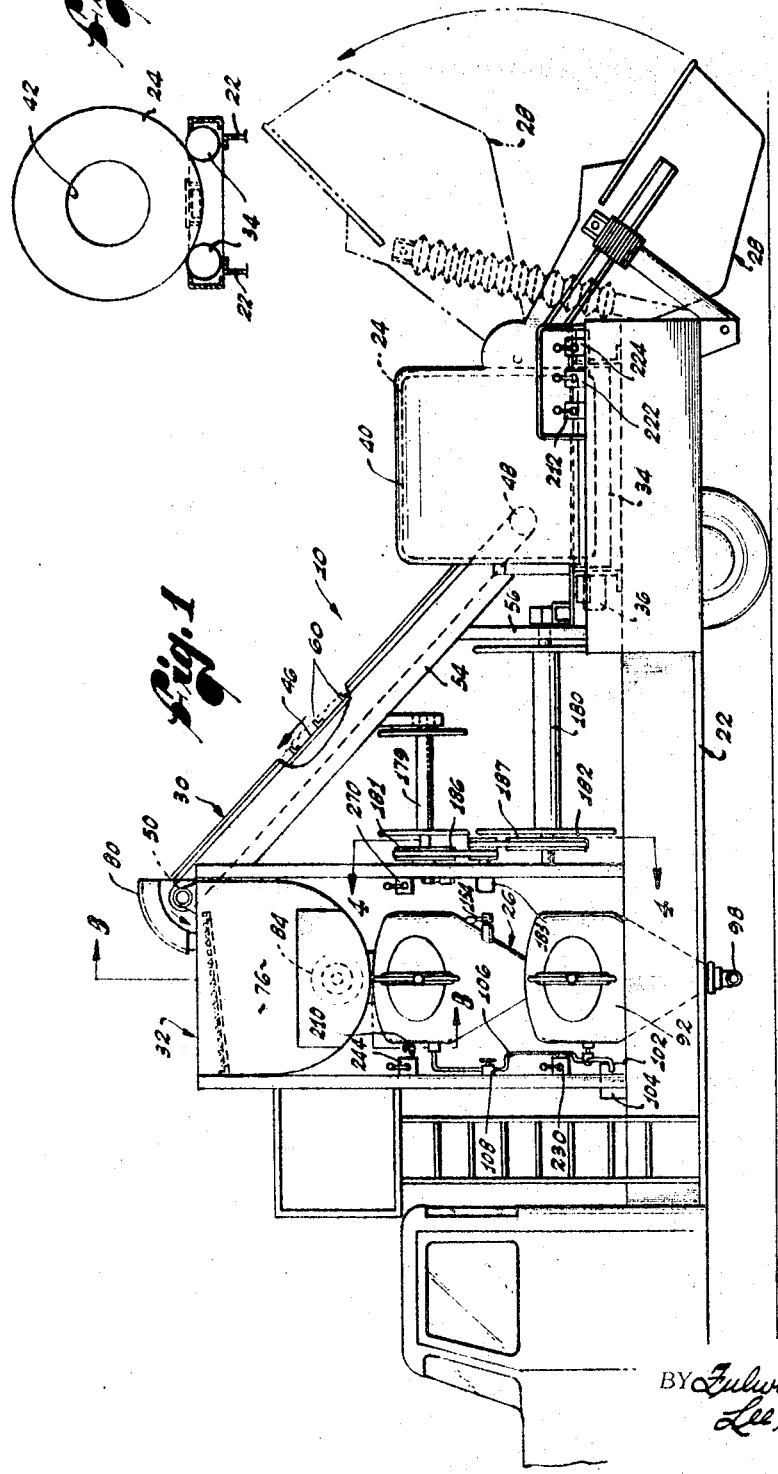
INVENTOR.
LEWIS COX
BY Fulwider, Patton, Rieber, Lee, and Utecht
ATTORNEYS Sept. 2, 1969 L. COX 3,464,676
MIXER-DISTRIBUTOR FOR DRY CEMENTITIOUS MATERIAL
Filed Oct. 9, 1967 4 Sheets-Sheet 2
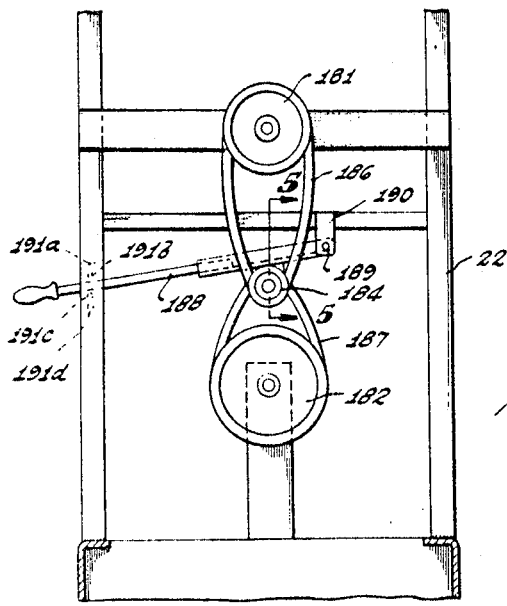
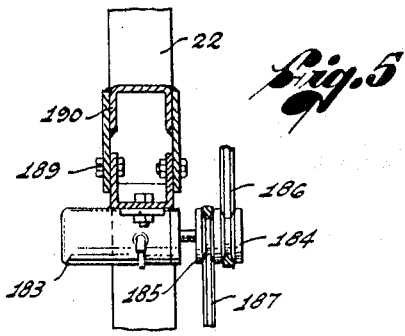
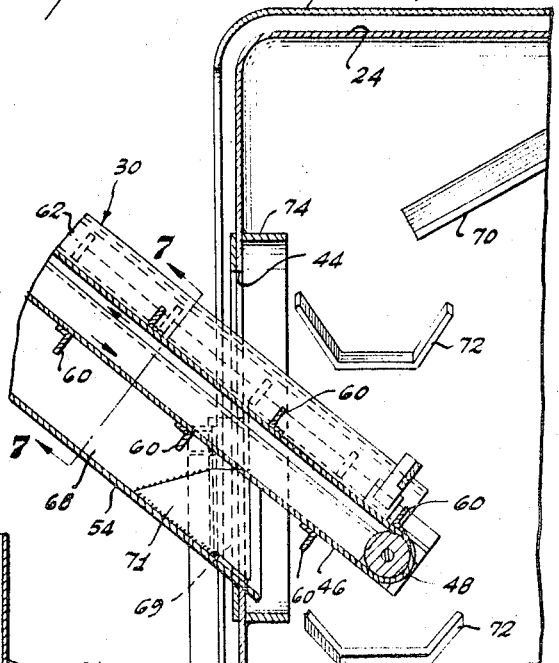
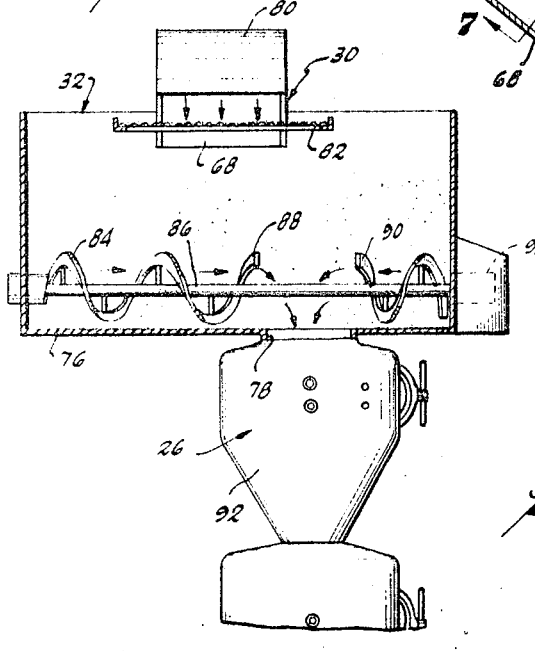
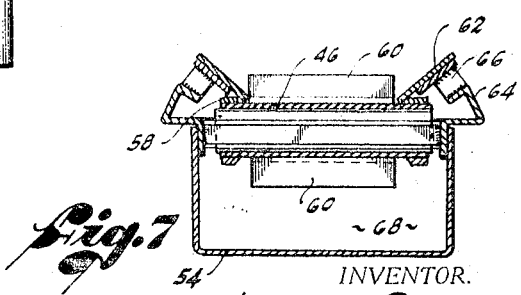
INVENTOR.
LEWIS COX
BY Fulwider, Patton, Rieber
Lee, and Utecht
ATTORNEYS

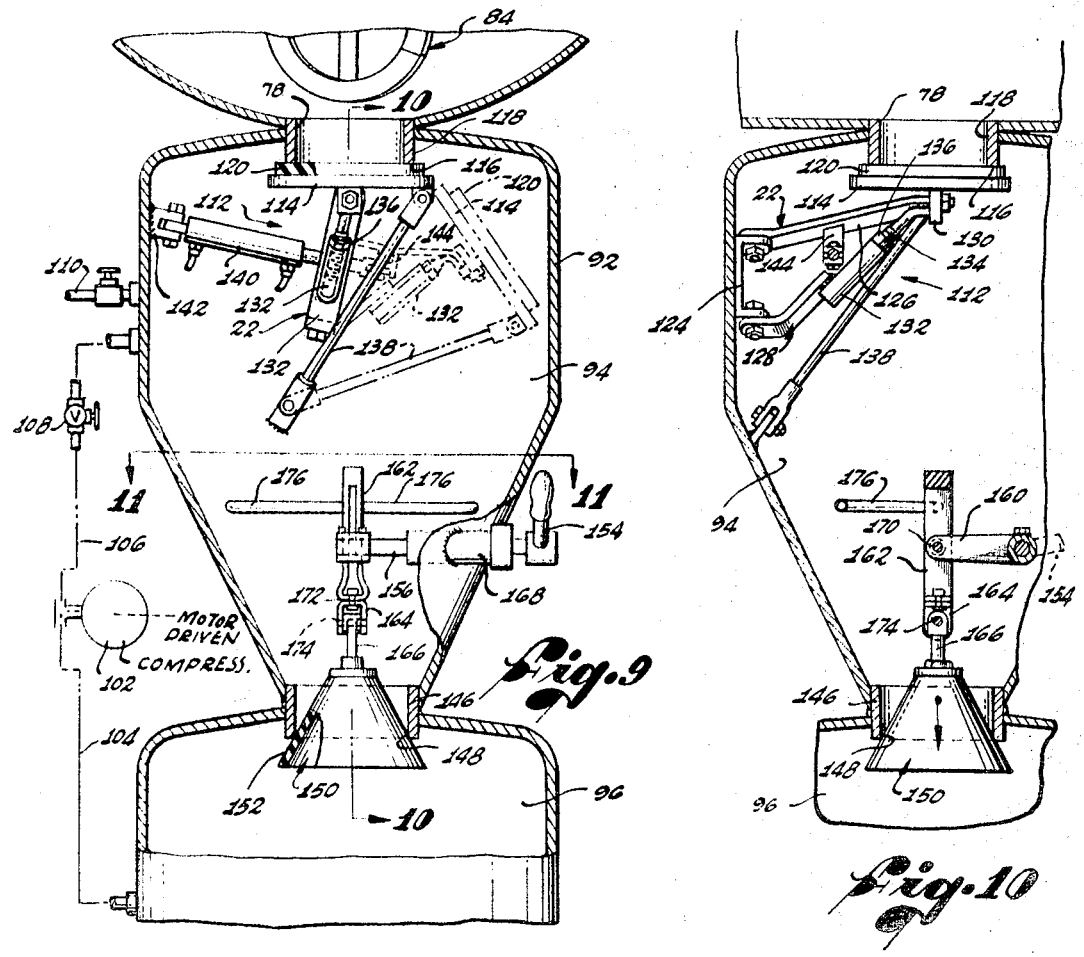
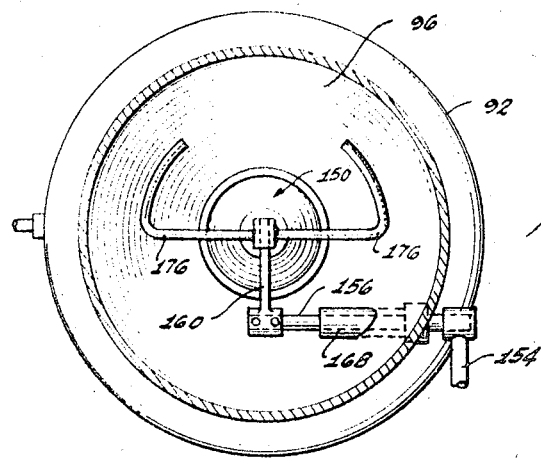

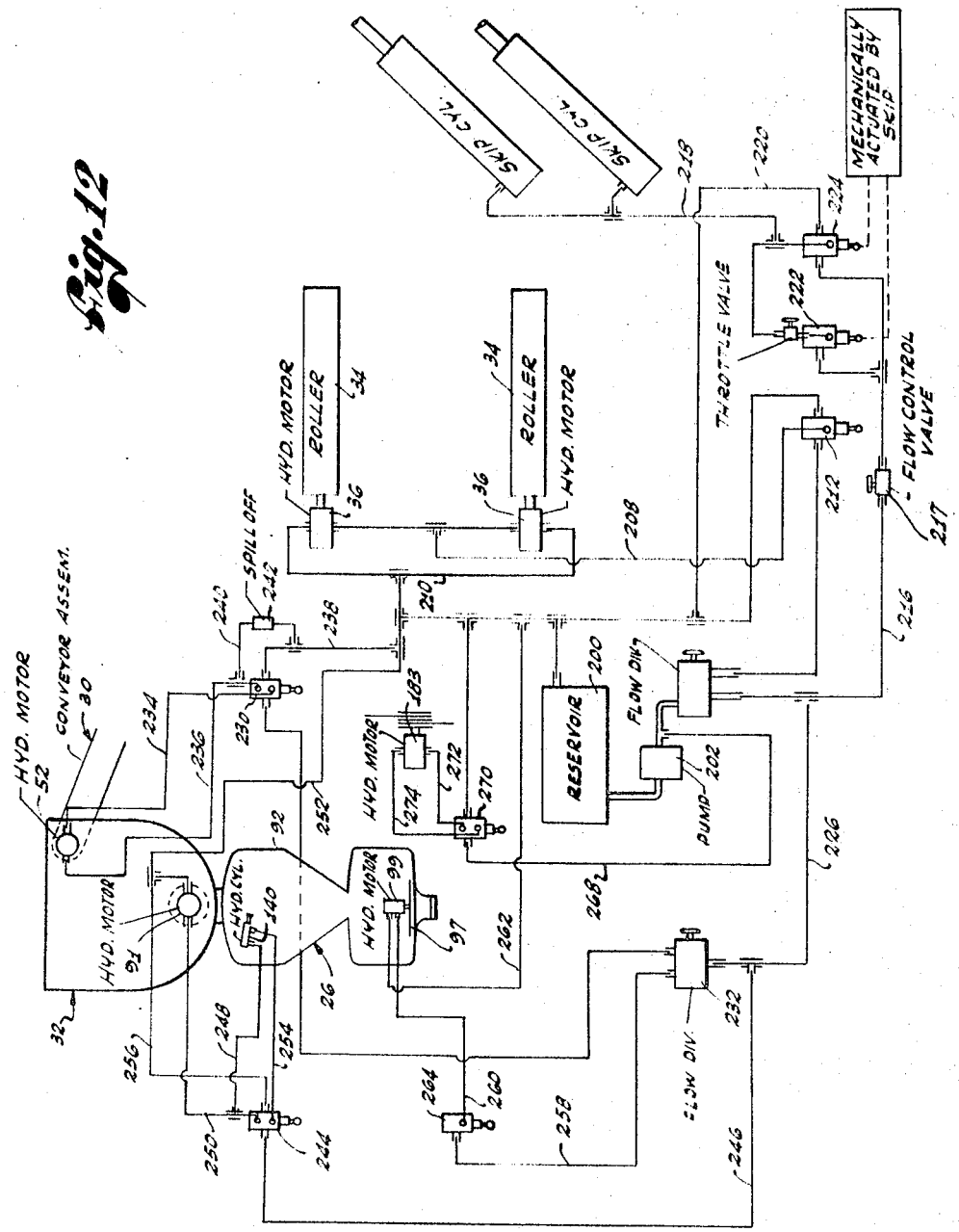

United States Patent Office 3,464,676
Patented Sept. 2, 1969

3,464,676
MIXER-DISTRIBUTOR FOR DRY CEMENTITOUS MATERIAL
Lewis Cox, 11654 Sheldon St.,
Sun Valley, Calif. 91352
Filed Oct. 9, 1967, Ser. No. 673,730
Int. Cl. B28c 1/00, 5/18
U.S. Cl. 259—153                15 Claims

ABSTRACT OF THE DISCLOSURE

An improved dry cementitious material mixer-distributor having a horizontally, rotatably supported mixing drum, a skip for dumping materials to be mixed into the drum in through a feed opening in the rear, and a conveyor assembly which passes into the drum through a forward discharge opening in the drum. The conveyor assembly transfers the mixed materials from the drum at an upward angle and discharges them into a feed hopper. Feed means in the hopper discharges material therefrom into a double chamber pneumatic pump, which, in turn, pumps the mixed materials to the desired location.

Background of the invention

This invention relates to dry cementitious material mixer-distributors such as are used in the pneumatic placement of concrete and, more particularly, to improve apparatus of this type.

Prior mixer-distributors for dry cementitious material have been subject to many operational problems and disadvantages. In transferring material from a mixing drum to pumping apparatus in these prior units, the mixed material is caused to spill out of the drum into a collecting hopper from which it is conveyed, usually by a bucket-type conveyor, into a feed hopper. Material frequently builds up in the collecting hopper and tends to jam the conveyor. This necessitates shutting down the unit, and results in time consuming and, hence, costly repairs. Moreover, the constituents of the mixed material may settle out during this build up in the collecting hopper, resulting in defects in the concrete that is eventually placed.

In the feed hopper of most prior art apparatus, the mixed material then passes intermittently into a pressure pump. Selective opening and closing of the passage between the hopper and the pump and effecting sealing of the passage have presented serious problems. The opening and closing are normally done manually and are relatively time consuming operations, not to mention the leakage problems that occur. For effective and efficient placement of concrete, it will be appreciated that the mixer-distributor should be capable of running for extended periods without being shut down.

In the pneumatic placement of concrete, dry mix (cement and aggregate) is fed under pressure from a pump through a hose to a discharge nozzle. Water is supplied to the nozzle through a separate hose and is admixed with the dry materials. The hoses that are employed are often very lengthy and, hence, cumbersome to handle. As a result, handling them has been a time consuming task and one that impairs overall efficiency of the unit and crew.

Summary of the invention

Briefly, and in general terms, a mixer-distributor for dry cementitious material constructed in accordance with the invention embodies a rotating drum with a loading opening and a discharge opening. A continuous conveyor assembly extends through the discharge opening into the drum and operates at selected intervals to convey mixed material from the drum to a feed hopper. With this arrangement, the tendency of the conveyor assembly to jam as a result of material building up in a collecting hopper or the like is obviated. Accordingly, the mixer-distributor of the invention is more reliable in operation than units of the prior art.

In the preferred embodiment, the conveyor assembly is driven by a reversible hydraulic motor so that the conveyor operation may be reversed. This is advantageous from the standpoint of enabling material in the conveyor to be discharged back into the drum where it is remixed. The conveyor assembly is also constructed and arranged to cause overflow from the feed hopper to flow back into the drum.

Efficiency of the mixer and distributor of the invention is enhanced by providing improved feeding means in the feed hopper. Such means incorporate a pair of reverse pitch augers that feed toward a central discharge opening in the hopper. This prevents material from accumulating at one or both ends, as is often the case with the apparatus of the prior art.

A power-operated closure assembly is provided at the inlet of a double chamber pump where material is received from the feed hopper. The closure assembly is selectively operable by simply actuating controls to cause material to be fed into the first chamber of the pump. The opening between the two pump chambers is sealed when desired by an inverted conical member which is received in sealing engagement in the opening.

For the purpose of receiving the hoses for the dry materials and the water and for reeling them in under power, a pair of power-operated spindles are provided. A single motor is provided for driving both spindles, and control means enable the spindles to be operated independently of one another.

Brief description of the drawings

FIGURE 1 shows a side view of a dry cementitious material mixer-distributor constructed in accordance with the invention and mounted on a truck body;

FIGURE 2 is a diagrammatic end view illustrating the drive and mounting means of the mixing drum;

FIGURE 3 is a diagrammatic plan view, similar to FIGURE 2, of the mixing drum illustrating the further detail of the mounting thereof;

FIGURE 4 is a fragmentary sectional view taken along the line 4—4 of FIGURE 1;

FIGURE 5 is a fragmentary sectional view taken along the line 5—5 of FIGURE 4;

FIGURE 6 is a fragmentary sectional view illustrating the manner in which the conveyor assembly extends into and is associated with the mixing drum;

FIGURE 7 is a sectional view taken along the line 7—7 of FIGURE 6;

FIGURE 8 is a sectional view taken along the line 8—8 of FIGURE 1;

FIGURE 9 is a vertical medial sectional view illustrating portions of the pump and feed hopper and closure means at the juncture of the feed hopper and first chamber of the pump;

FIGURE 10 is a fragmentary sectional view taken along the line 10—10 of FIGURE 9;

FIGURE 11 is a fragmentary sectional view taken along the line 11—11 of FIG. 9; and FIGURE 12 is a semi-schematic view of the hydraulic system incorporated in the mixer-distributor of the invention.

Referring to the drawings and, in particular, to FIGURE 1, the mixer-distributor of the invention, indicated generally by the reference number 20, is shown mounted on a truck body 22. The mixer-distributor embodies generally a mixing drum 24 and a double chamber pneumatic pump 26. A hydraulically actuated skip 28 mounted on the rearward end of the truck body 22 serves to dump materials placed in the skip into the drum 24 for mixing. Mixed material from the drum 24 in turn is conveyed by a belt-type conveyor assembly 30 to a feed hopper assembly 32 from which it is fed to the pump 26.

The mixing drum 24 is mounted for rotation about its central axis, which in the illustrative case is oriented generally horizontally. Mounting of the drum is achieved by a pair of elongated, cylindrical drive rollers 34 which receive the drum in cradle-like engagement, as shown diagrammatically in FIGURE 2. The rollers 34 are mounted on the body 22 in parallel, spaced apart relation. Preferably, the rollers 34 are driven to rotate the drum 24 by a pair of hydraulic motors 36. As can be seen in FIGURES 2 and 3, a pair of relatively small guide rollers 38 mounted on the body 22 for rotation about axes perpendicular to the axis of the drum, restrain longitudinal movement of the drum, thus assuring that it remains cradled between the rollers 34. A cover 40 secured to the truck body 22 extends over the drum 24 to protect it from the elements.

The drum 24 is provided with a rearward feed opening 42 and a forward discharge opening 44. Material is fed into the drum through the feed opening 42 by the skip 28. The construction in mounting the skip are disclosed in detail in my United States Patent No. 3,218,045, entitled Mobile Concrete Mixer Assembly, and for that reason are not disclosed herein. It is noted that the skip is hydraulically actuated and is pivotal between the positions shown in full and phantom lines in FIGURE 2 to dump the materials to be mixed into the drum 24.

As previously noted, the conveyor assembly 30 operates to convey mixed material from the drum 24 to the feed hopper assembly 32. It is inclined upwardly from the drum and disposed with its material-receiving end extending into the drum 24 through the discharge opening 44 as shown in FIGURE 6. At its opposite or material-discharging end, the conveyor assembly discharges into the hopper assembly adjacent the top thereof in the manner shown in FIGURES 1 and 8. The conveyor assembly 30 is of the belt-type and comprises an elongated, continuous belt 46 supported between rollers 48 and 50 positioned at its ends within the loop defined by the belt. The rollers are supported for rotation by a housing 54 that extends substantially the full length of the conveyor assembly and, in turn, is mounted on the truck body 22 adjacent the drum 24 by means of a vertically extending support 56. Adjacent the material-discharging end of the conveyor assembly, the housing 54 is fixed to the feed hopper assembly. For moving the belt to convey material, the roller 50 is driven by a reversible hydraulic motor 52.

The belt 46 has a pair of ridges 58 disposed along its marginal edges over its entire length and mounts at longitudinally spaced intervals material-retention bars 60. As may be seen in FIGURES 6 and 7, these bars 60 extend transversely across the belt, thereby insuring that material is retained on the belt 46 as it operates to convey material from the drum 24 to the hopper assembly 32.

To prevent material on the belt 46 from falling off its marginal edges, guide flanges 62, cooperable with the ridges 58 on the belt, are provided on the housing 54. These flanges extend down at obtuse angles to the belt into close proximity to the upper or material-carrying surface of the belt 46 and ride along the inner edges of the ridges 58. Each of the guide flanges 62 is mounted by means of assemblies made up of brackets 64 that extend along the full length of the housing 54 and a plurality of longitudinally spaced webs 66. Each of the brackets 64 is secured to the housing and, in turn, to the respective one of the flanges 62 by means of the webs 66.

It is desired that material that inadvertently falls off the belt 46, as well as overflow from the feed hopper assembly 32, be discharged back into the drum 24. To this end, the housing 54 is made box-like in configuration, so as to define a material collecting and overflow chute 68.

As may be seen in FIGURE 8, the chute 68 opens into the feed hopper assembly 32 adjacent the top thereof. Accordingly, overflow from the hopper flows gravitationally back into the drum. At the lower end of the chute 68, as shown in FIGURE 6, a ring section 69 is fixed to the housing and cooperates with a pair of triangularly-shaped plates 71 secured to the housing and to the ring section to channel any material in the chute into the drum 24.

The mixer drum 24 is provided with a plurality of material-carrying channels 70 secured to its inner periphery at angularly spaced intervals. As may be seen in FIGURE 6, these channels 70 extend generally longitudinally and are disposed at a slight angle respect to the longitudinal axis of the drum. The channels 70 project inwardly and serve to carry the material being mixed up the side of the drum during rotation and cause it to tumble to effect mixing. In addition, these channels 70 cause the material to progress toward the front of the drum 24. Adjacent the forward end of the drum 24, a plurality of material-carrying buckets 72 are provided. These buckets cooperate with the channels 70 to effect mixing and, in addition, cause the mix to be deposited on the material-receiving end of the conveyor assembly 30. To aid in preventing loss of material through the discharge opening 44, an annular ring 74 is secured to the end wall of the drum 24 and projects inwardly in surrounding relationship to the opening 44.

The hopper assembly 32 embodies an open top hopper 76 with a generally centrally located outlet 78 in its bottom wall. Material is received in the hopper 76 from the conveyor assembly 32 adjacent the top of the hopper, as shown in FIGURE 8. The collecting and overflow chute 68 joins the hopper 76 at that location. A guard or baffle 80 in the form of an arcuate scoop is provided on the hopper adjacent the conveyor assembly 32 to direct material downwardly into the hopper. In addition, a screen 82 of appropriate mesh is provided for screening out large pieces of material which have been inadvertently included in the mix.

Material in the hopper 76 is fed toward the outlet 78 with the aid of a power-operated auger assembly 84, illustrated in FIGURE 8. It embodies an elongated shaft 86 journalled for rotation in the hopper 76 and extending transversely across the bottom thereof at a location adjacent to, but spaced above the outlet 78. Oppositely pitched helical bands 88 and 90 are fixed to the shaft on opposite sides of the hopper outlet 78. Rotation of the shaft 86 in a clockwise direction, as viewed from the right-hand side of FIGURE 8, causes material in the hopper 76 to be fed toward the outlet 78. The shaft 86 is rotated by a hydraulic motor 91. As may also be seen in FIGURE 8, the bands 88 and 90 move in close proximity to the bottom wall of the hopper 76 and, with this arrangement, material is prevented from accumulating in the ends of the hopper 76 or along the bottom and remaining there for any extended period.

From the hopper 76, material is fed into the pump 26 which, in turn, pumps it to the desired location. The pump 26, illustrated in FIGURES 1 and 8–11, is of the double chamber, pneumatic type. In general, it has a housing 92 shaped to define an upper chamber 94 which receives material through an inlet 95 from the hopper 76 and a lower chamber 96 in communication therewith and, preferably mounting an agitator 97 driven by a hydraulic motor 99. At the lower end of the housing, an outlet 98 (FIG. 1) from the chamber 96 is provided, mixed material being pumped through a hose (not shown) connected to the outlet 98 to the desired location.

The upper chamber 94 is alternately pressurized and at ambient pressure during periods of operation of the pump. It is at ambient pressure when material is being introduced therein and subsequently sealed and pressurized when material is allowed to pass from the upper into the lower chamber. In operation, when the pressure in the upper chamber 94 is equal to that in the lower chamber 96, valve means 100 sealing the juncture between the two chambers is opened to permit passage of material into the lower chamber 96. With this arrangement, it will be appreciated that material may be pumped continuously from the pump 26. Pressurized air is supplied continuously to the lower chamber 96 by means of a compressor 102 through a conduit 104. The compressor 102 also supplies pressurized air intermittently to the upper chamber 94 when desired through a conduit 106 having a valve 108 installed therein. Venting of the upper chamber is achieved with a valved conduit 110 leading to the chamber 94.

It is desired that opening and closing of the pump inlet 95 be capable of being accomplished quickly and easily. Moreover, as discussed above, it is important that good sealing be effected at that location. To this end, closure means 112 are provided within the chamber 94. The closure means comprise a valve plate 114 movable into and out of sealing relationship with a planar valve seat 116 afforded by the lower end of an annular flange 118 that couples the outlet 78 of the hopper 76 to the inlet 95 of the pump 26. Sealing is enhanced by securing a resilient, deformable pad 120 secured to the upper surface of the plate 114.

Movement of the valve plate 114 in the illustrative embodiment is between the closed position, shown in full lines in FIGURE 9, and the open position, shown in phantom lines in that figure. Mounting for such movement is by means of an arm assembly 122 that is pivotal about an axis slightly offset with respect to a line drawn normal to the plane of the valve seat 116. The arm assembly 122 comprises a C-shaped bracket 124 secured to the wall of the chamber 94 and, in turn, pivotally secured to an arm 126 at its upper end and an adjustable link 128 at its lower end. The distal ends of the arm 126 and link 128 are joined together and pivotally connected to a yoke 130 projecting downwardly from the lower side of the plate 114 centrally thereof. Tilting of the plate 114 is in this instance about a horizontal axis.

Adjustment of the vertical position of the plate 114 is provided for by forming the link 128 with a tube 132 that telescopically receives an externally threaded rod 134. A nut 136 is provided on the rod 134 and rotation thereof causes the link to extend or retract. Ample freedom is provided at the pivotal connection between the arm 126 and bracket 124 to enable this adjustment to be accomplished.

To position the plate at the desired orientation with respect to the seat 116 when the plate 114 is in its closed position, as well as to tilt the plate to enable it to move completely out of alignment when the inlet 78 to the chamber 94, a link 138 is provided. The link 138 is pivotally connected to the plate 114 adjacent its periphery and to the inner wall of the chamber 94 at a location spaced below the bracket 124. During swinging of the arm assembly 122 carrying the plate, the link causes the plate to tilt down in the manner shown in phantom lines in FIGURE 9.

The plate 114 is caused to move in the manner set forth above by a double acting hydraulic cylinder 140. This cylinder is pivotally mounted at its opposite ends to a bracket 142 affixed to the inner wall of the chamber 94 and to a cross bracket 144 fixed to the arm 126 and link 128. When the cylinder 140 is in its retracted condition, as in full lines in FIGURE 9, of plate 114 is in its closed position. On the other hand, when the cylinder 140 is extended, the plate moves to its phantom line position of FIGURE 9.

The valve means 100 sealing the passage between the two pump chambers 94 and 96 is open when, as previously noted, the upper chamber 94 is pressurized to substantially the same degree as the lower chamber 96, and it is desired to recharge the latter. At all other stages of operation, the valve means 100 is closed. An annular flange 146 couples the chambers 94 and 96 together and its lower end defines a valve seat 148 cooperable with a frusto-conical poppet 150 to sealingly close the passage. As shown in FIGURES 9 and 10, the poppet 150 is receivable in the passage defined by the flange 146. As with the valve plate 114, the poppet 150 has a layer or pad 152 of resilient, deformable material secured to its exterior surface so as to enhance sealing. Opening of the chamber-connecting passage to permit such a recharging of the chamber 96 is achieved by moving the poppet 150 downwardly away from the flange 146.

Again referring to FIGURES 9–11, movement of the poppet 150 is effected by rotating a hand-operated lever 154 disposed exteriorly of the housing 92. The lever 154 and poppet 150 are operatively connected by a linkage, including, in series, a shaft 156 secured to the lever 154, an arm 160, a split linking bracket 162, a U-shaped bracket 164, and a rod 166. The shaft 156 is journalled for rotation in a sleeve 168 fixed to the housing and projecting through a wall of the chamber 94. The arm 160 is fixed at one end to the shaft 156 and pivotally connected at 170 (FIG. 10) to the split linking bracket 162. The bracket 162, in turn, is pivotally connected by means of a vertically oriented pivot pin 172 to the U-shaped bracket 164. Finally, the bracket 164 is pivotally connected at 174 to one end of the rod 166, the other end thereof being secured to the poppet 150. With this arrangement, it will be appreciated that movement of the lever 154 to pivot the shaft 156 operates the poppet 150. The poppet 150 has some degree of freedom for lateral movement, thereby assuring that it seats properly in the flange 146 to effect good sealing between the chambers 94 and 96.

To aid in recharging the lower chamber 96, material-dislodging means are provided in the upper chamber 94 and operatively associated with the valve means 100. Such dislodging means are in the form of a pair of hook-shaped arms 176 fixed to the split linking bracket 162 at a location above its connection 170 to the arm 160. The arms 176 initially project outwardly from the bracket 162 and have their end portions disposed adjacent the wall of the chamber 94. When the lever 154 is actuated, it will be appreciated that the arms 176 move up and down, thereby dislodging material in the lower portion of the chamber to aid flow into the lower chamber 96.

In order to further enhance the efficiency of the mixer-distributor of the invention, a power-operated hose-reeling device is provided on the truck body 22. As may be seen in FIGURE 1, two reels 179 and 180, one for the hose for the dry cementitious material and the other for the water hose, are mounted on the body 22 and arranged for rotation about their respective axes. Sheaves 181 and 182 (FIG. 4) are secured to the reels 179 and 180, respectively, in coaxial relation therewith. The reels are driven by a hydraulic motor 183 mounting sheaves 184 and 185 conected by belts 186 and 187 to the reel sheaves 181 and 182, respectively.

The motor 183 is disposed between the reel sheaves 181 and 182 in vertical alignment with them, and is carried on an actuating lever 188 pivotally connected at 189 to a support bracket 190 on the body 22. The lever 188 is arranged in its position of FIGURE 4, in a "neutral" position, so that neither belt 186 or 187 is tensioned. On the other hand, when it is swung up or down from its position of FIGURE 4, one of the belts is tensioned. Holding pins 191a–d are provided on the body to hold the lever 188 in the desired position. As will be appreciated, when the lever 188 is disposed between pins 191b and c, as in FIGURE 4, neither belt is tensioned and the reels are inoperative. On the other hand, when the lever 184 is positioned between pins 191a and b, the belt 187 is tensioned and reel 180 is driven. Belt 186 is tensioned when the lever 188 is positioned between pins 191c and d to drive the reel 179.

These reels 179 and 180 and the above-described means for powering them, afford a simple, yet highly effective way of reeling in the hoses. As discussed above, this has presented a problem in the past in view of the fact that such hoses are lengthy and cumbersome to handle.

Pressurized hydraulic fluid for operating the various hydraulic motors incorporated in the mixer-distributor 20 of the invention and for operating the cylinder 140 of the closure means at the pump inlet 78 and a pair of cylinders 195 for operating the skip 28 is supplied by the system illustrated schematically in FIGURE 12. The system embodies generally a reservoir 200, a pump 202 coupled to the reservoir for supplying the fluid, a main flow divider 204 in series with the pump downstream thereof, and a series of pressure and return lines with control valves coupled to the motors.

With particular reference to FIGURE 12, it may be seen that fluid under presure is supplied to the motors 36 for operating the mixing drum 24 through pressure lines 206 and 208. A return flow path from the motors is provided by the line 210. Control of such flow is achieved by the valve 214 which is of the on-off type. A bypass line couples the valve 212 back to the reservoir 200 in order to assure that the pump 202 is not overloaded when the valve 214 is closed and all the remaining hydraulic elements of the system are inoperative.

The hydraulic cylinders 195 for operating the skip 28 are coupled to the pump 202 by pressure lines 216 and 218, the lines 216 having a flow control valve 217 therein. Return flow to the reservoir 200, when the cylinders retract under the weight of the skip, is through line 218 and through a return line 220. Two valves 222 and 224 are connected in parallel betwen the lines 216 and 218 to provide a pair of flow paths, the return line 220 being coupled to the valve 224. Both valves 222 and 224 have three position, an open, a closed, and a neutral position. Moreover, the valve 222 embodies a throttle, so as to provide for relatively reduced flow through it.

In operation of the skip 28, both valves 222 and 224 are moved to their open positions to cause the cylinders 195 to extend. Adjacent the end of the stroke, the valve 224 is mechanically actuated to its neutral position. Accordingly, the remainder of the stroke is relatively slow, because of the reduced flow through valve 222. At the end of the stroke, the valve 222 is also mechanically actuated to a neutral position, whereby the cylinders 195 remain extended. To retract the cylinders, valve 224 is moved to its open position to permit bleeding of fluid back through the return line 220.

For operating the motor 52 that drives the conveyor assembly 30, pressurized fluid is supplied through pressure lines 226 and 228 leading to a control valve 230. In series in this flow path between lines 226 and 228 is a flow divider 232. The valve 230 is of the three-position type, having a forward position, a reverse position, and a neutral position. In a forward position, corresponding to forward operation of the conveyor assembly, pressurized fluid flows to the motor 52 through the line 234 and returns through lines 236 and 238 to the reservoir 200. In the neutral position, flow is blocked and the conveyor assembly 30 is then, of course, inoperative.

As will be recalled, it is desired that the conveyor assembly 30 operate relatively slowly in its reverse mode of operation. To accomplish this, a bypass line 240 is coupled between the lines 234 and 238 and has a spill-off valve 242 therein. In the reverse mode of operation of the valve 230, fluid is supplied through line 236 to operate the motor, returning through line 234. It will be seen that in this mode a portion of the fluid, depending upon the restriction afforded by the spill-off valve, is bypassed back to the reservoirs thus causing the conveyor assembly to operatae at the desired, relatively slow speed.

Turning now to operation of the closure means embodying the cylinder 140 and operation of the auger 84 in the feed hopper assembly 32 driven by the motor 91, such operation is controlled by a three-position valve 244 having loading, closing and neutral positions. The valve 244, in turn, is coupled to the pump by the pressure lines 246 and 226. An important advantage of the mixer-distributor of the invention is that the feed auger operates automatically when the closure means for the inlet to the pump chamber 94 is open. Accordingly, when the valve 244 is in its loading position, pressurized fluid is supplied through the lines 248 and 250 to extend the cylinder 140 and to operate the auger motor 91, return from the motor being through the line 252. Bleeding of fluid from the opposite end of the cylinder 140, which is of the double acting type, is through lines 254 and 256 coupled to the return line 252. When it is desired to operate the closure means to seal the pump inlet 78 and to terminate operation of the auger assembly 84, the valve 244 is moved to its closing position to cause pressurized fluid to be supplied through the line 254 only. In this mode, fluid is bled out of the opposite end of the cylinder 140 through the line 248. Preferably, although not necessarily, the valve 244 has the neutral position in which no pressurized fluid is supplied.

Pressurized fluid for operating the agitator 97 incorporated in the lower chamber 96 of the pump means is supplied to the motor 99 through lines 226, 258 and 260. Return in this case is through the line 262 coupled to the reservoir 200. An on-off control valve 264 is in series with the lines 258 and 260 for controlling such operation.

Operation of the motor 183 for powering the hose reels 179 and 180 is produced by hydraulic fluid supplied through a flow path including a pressure line 268 and a three-position control valve 270. Depending upon the desired direction of rotation of the reels, pressurized fluid is supplied from the valve 270 through one or the other of the lines 272 and 274 and returned through the other thereof back through the line 276 to the reservoir 200.

It is believed that the operation of the mixer-distributor 10 of the invention is apparent from the foregoing description of the structure. In brief, the materials to be mixed, normally comprising aggregate, such as sand, and cement, are dumped into the skip 28 when the latter is positioned adjacent or on the ground, as in full lines in FIGURE 1. Upon the skip being loaded to the desired extent, the valves 222 and 224 are actuated to cause it to swing up to its phantom line position of FIGURE 1 to dump the materials into the mixer drum 24. The drum 24 rotates under the control of the valve 212 to cause the material to be thoroughly mixed. During such mixing the conveyor assembly 30 may be operated in the reverse direction to prevent any undesirable accumulation of material on the material-receiving end of the assembly and to return any material otherwise on the belt 46 to the drum.

When the initial charge of material in the drum 24 has been mixed to the desired extent, the conveyor assembly 30 is actuated to convey mix from the drum to the hopper assembly 32 where it accumulates. To charge the pump 26 for operation, the control valve 244 is actuated to open the closure means blocking the inlet 78 and automatically operate the auger. In addition, the hydraulic motor operating the agitator in the lower pump chamber is actuated by means of the valve 264 to aid the pumping. Operation of the pump is then carried out in the manner previously described on a continuous basis, with the pressure in the upper pump chamber 94 being alternately applied and relieved as material is transferred from the upper to the lower chamber 96 and is introduced into the upper chamber 96, respectively.

An important feature of the mixer-distributor of the invention is that such operation may be carried out continuously, as previously noted, and with a minimum of labor required. Once operation is under way, the operator need only control operation of the skip 28 to charge the drum 24 with materials and control the charging of the upper pump chamber 94 and effect the transfer of mix to the lower pump chamber 97 by operating the lever 154.

I claim:
1. In a mixer-distributor of the type described, apparatus comprising:
   a generally cylindrical mixing drum with a central axis and having a discharge opening adjacent one end and an inlet opening, said drum being disposed with the said axis generally horizontal and arranged for rotation about said axis;
   means for rotating said drum;
   continuous conveyor means having a material-receiving end and a material-discharging end, said conveyor means having its material-receiving end projecting into said drum through said discharge opening and disposed therein for receiving material mixed in said drum;
   power means for operating said conveyor means;
   and means forming an overflow and collection chute beneath said conveyor means, said chute extending along substantially the entire length of said conveyor means and arranged to discharge into said drum, whereby material received in said chute is discharged back into said drum.

2. Apparatus as in claim 1, wherein said power means includes a hydraulic motor and a hydraulic system for supplying pressurized fluid selectively, in a first mode of operation, to move said conveyor means in a forward direction and, in a second mode of operation, to move said conveyor means in the reverse direction, said system including a spill-off valve effective when said system is in said second mode to cause said conveyor means to move at a slower speed as compared to when it is moving in its forward direction.

3. In a mixer-distributor of the type described, apparatus comprising:
   a support frame;
   a generally cylindrical mixing drum with a central axis and having a discharge opening at one end and an inlet opening, said drum being arranged for rotation about said axis;
   means for rotating said drum;
   a feed hopper mounted on said support frame and having an inlet opening adjacent its top and a bottom outlet opening, said inlet opening being located above said discharge opening in said drum;
   a continuous, belt-type conveyor having a material-receiving end and a material-discharging end, said conveyor having its material-receiving end projecting through said discharge opening into said drum for receiving material and inclined upwardly therefrom, with its material-discharging end arranged to discharge into said inlet opening of said feed hopper;
   power means for operating said conveyor;
   pump means with an inlet, said pump means being operable to distribute material received from said feed hopper through said inlet; and
   means connecting the outlet opening in said feed hopper to the inlet of said pump means.

4. Apparatus as in claim 3, wherein said outlet opening in said feed hopper is located generally centrally in the bottom thereof; and
   further including a pair of oppositely pitched feed augers disposed in said feed hopper on opposite sides of said outlet opening and operable to feed material therein toward said outlet opening, and power-operated means for driving said augers.

5. Apparatus as in claim 4, further including:
   closure means on said pump means actuatable between a closed position, wherein it pneumatically seals off the inlet of said pump and an open position, wherein said inlet is open to permit flow of material from said feed hopper into said pump means;
   power-operated means for moving said closure means selectively between its open and closed positions; and
   control means associated with the power-operated means for driving said augers, whereby said augers are so operated when said closure means is in its open position and inoperative when said closure means is in its closed position.

6. Apparatus as in claim 3, further including closure means on said pump means actuatable between a closed position, wherein it pneumatically seals off the inlet of said pump and an open position, wherein said inlet is open to permit flow of material from said feed hopper into said pump means.

7. In a pneumatic pump for cementitious material having a pressure chamber and an inlet to said chamber, apparatus comprising:
   a pump housing;
   means on said housing around said inlet forming a generally planar valve seat;
   a valve plate engageable with said seat to sealingly close said inlet;
   arm means pivotally secured at one end thereof to said housing within said chamber and pivotally mounting at the other end thereof said valve plate, said arm means being movable from a first position wherein said valve plate is so engaged with said seat and a second position wherein said valve plate is out of such engagement;
   means on said valve plate and on said housing for tilting said valve plate relative to said arm means during such movement of said arm means; and
   power-operated means for moving said arm means between its first and second positions.

8. Closure means as in claim 7, wherein said power-operated means includes a double acting hydraulic cylinder pivotally connected at one of its ends to said housing at a location spaced from the pivotal connection of said arm means to said housing and at its other end to said arm means.

9. Closure means as in claim 7, wherein said means for tilting said plate comprises an elongated link pivotally connected at one of its ends to said housing and at the other of its end to said valve plate at a location spaced from the pivotal connection of said arm means and said plate.

10. Closure means as in claim 9, wherein said valve plate has a pad of resilient, deformable material secured to its seat-engaging surface.

11. Closure means as in claim 9, wherein said link positions said valve plate parallel to the plane of said seat when said arm means is in its first position.

12. Closure means as in claim 7, wherein said arm means moves pivotally relative to said housing about an axis of rotation which is slightly off-set with respect to a line drawn normal to the plane of said valve seat.

13. Closure means as in claim 7, further including adjustment means on said arm means for adjusting the position of said valve plate relative to said housing.

14. In a mixer-distributor of the type described, apparatus comprising:
   a support frame;
   a pair of hose reels mounted for rotation on said frame in generally side-by-side relation;
   a pair of reel sheaves connected, on each, to said reels and disposed substantially in alignment with, but spaced from one another, said reel sheaves being arranged with their axes of rotation substantially parallel;
   motor means for rotating said reel sheaves and embodying a pair of drive sheaves associated with respective ones of said reel sheaves, said motor means being positioned intermediate said reel sheaves;
   a pair of belts supported between respective ones of said reel sheaves and drive sheaves and arranged when other tension to produce rotation of said reel sheaves in response to rotation of said drive sheaves; and
   a lever carrying said motor means and movably mounted on said support frame, said lever being movable in one direction to tension only one of said belts to produce rotation of its associated reel and in the opposite direction to tension only the other of said belts to produce rotation of its associated reel.

15. Apparatus as claimed in claim 14, wherein said lever is pivotally mounted on said frame and is movable between a neutral position in which neither of said belts is tensioned, a first tension position in which one of said belts is tensioned and the other is free from tension, and a second tension position in which the other of said belts is tensioned and said one of said belts is free from tension.

References Cited

UNITED STATES PATENTS

| | | | |
|---|---|---|---|
| 1,966,647 | 7/1934 | Ross | 259—164 X |
| 2,404,694 | 7/1946 | Cohen | 259—30 |
| 2,615,693 | 10/1952 | Matirko | 259—151 |
| 2,899,182 | 8/1959 | Ridley | 259—151 |
| 3,096,968 | 7/1963 | Kempthorne | 259—147 |

ROBERT W. JENKINS, Primary Examiner

U.S. Cl. X.R.

259—162, 173, 151